(12) United States Patent
Shibata et al.

(10) Patent No.: US 8,264,550 B2
(45) Date of Patent: Sep. 11, 2012

(54) SHAKE CORRECTION APPARATUS, IMAGE PICKUP APPARATUS, AND METHOD FOR CONTROLLING SHAKE CORRECTION APPARATUS

(75) Inventors: Masahiro Shibata, Tokyo (JP); Kenichi Miyasako, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 12/813,913

(22) Filed: Jun. 11, 2010

(65) Prior Publication Data

US 2011/0013027 A1    Jan. 20, 2011

(30) Foreign Application Priority Data

Jul. 15, 2009   (JP) ................................ 2009-167274

(51) Int. Cl.
*H04N 5/225* (2006.01)
(52) U.S. Cl. ................................ 348/208.11
(58) Field of Classification Search .................... 396/55; 348/208.4, 208.99, 208.5, 208.6, 208.7, 208.11
See application file for complete search history.

(56) References Cited

U.S. PATENT DOCUMENTS

| | | | |
|---|---|---|---|
| 2001/0048474 A1* | 12/2001 | Yamazaki et al. | 348/207 |
| 2002/0101531 A1* | 8/2002 | Kaneda | 348/333.02 |
| 2008/0226277 A1* | 9/2008 | Uenaka et al. | 396/55 |
| 2010/0271496 A1* | 10/2010 | Obu | 348/208.4 |
| 2011/0149112 A1* | 6/2011 | Muukki et al. | 348/231.6 |

FOREIGN PATENT DOCUMENTS

| | | | |
|---|---|---|---|
| JP | 2006113468 A * | 4/2006 | |
| JP | 2006-191181 | 7/2006 | |

* cited by examiner

*Primary Examiner* — Jason Whipkey
(74) *Attorney, Agent, or Firm* — Cowan, Liebowitz & Latman, P.C.

(57) ABSTRACT

There is provided a shake correction apparatus having an image pickup optical system that includes a correction lens capable of moving in a direction orthogonal to an optical axis. The shake correction apparatus comprises: a detection unit that detects shake applied to the shake correction apparatus; a determination unit that determines a reference position of the correction lens; and a drive unit that drives the correction lens with the reference position serving as a center position, so as to correct the shake detected by the detection unit. The determination unit determines the reference position, in a range where a condition that a Modulation Transfer Function (MTF) of the image pickup optical system when the correction lens is positioned at the determined reference position is equal to or larger than a threshold is satisfied.

7 Claims, 4 Drawing Sheets

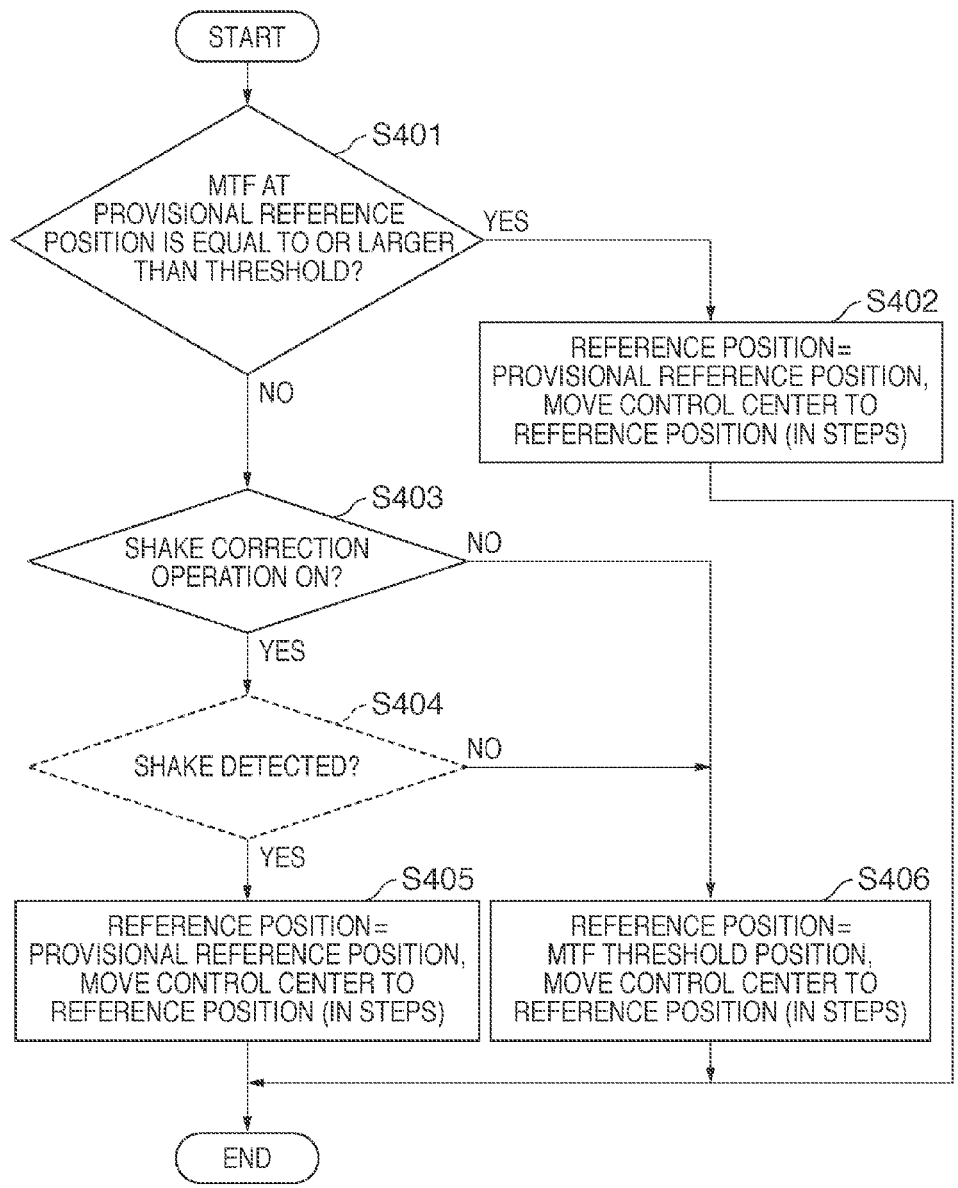

SHAKE CORRECTION APPARATUS, IMAGE PICKUP APPARATUS, AND METHOD FOR CONTROLLING SHAKE CORRECTION APPARATUS

BACKGROUND OF THE INVENTION

1. Field of the Invention

The present invention relates to a shake correction apparatus, an image pickup apparatus, and a method for controlling the shake correction apparatus.

2. Description of the Related Art

An image pickup apparatus is known in which shift (optical axis shift) of the center of an image pickup element from an optical axis of an image pickup optical system is corrected by moving a shake correction lens (Japanese Patent Laid-Open No. 2006-191181).

When the shake correction lens moves and thus the center of the lens shifts from the optical axis of the image pickup optical system, there is a reduction in optical performance (MTF: Modulation Transfer Function) of the image pickup optical system. However, in Japanese Patent Laid-Open No. 2006-191181, a reduction in optical performance is not considered, so there is a possibility that when a large optical axis shift is corrected, optical performance will be greatly reduced.

SUMMARY OF THE INVENTION

The present invention was made in view of these circumstances, and provides technology that suppresses a reduction in optical performance when correcting optical axis shift.

According to an aspect of the present invention, there is provided a shake correction apparatus having an image pickup optical system that includes a correction lens capable of moving in a direction orthogonal to an optical axis, the shake correction apparatus comprising: a detection unit that detects shake applied to the shake correction apparatus; a determination unit that determines a reference position of the correction lens; and a drive unit that drives the correction lens with the reference position serving as a center position, so as to correct the shake detected by the detection unit; wherein the determination unit determines the reference position such that the correction lens corrects shift from the optical axis of the center of an image pickup element that photo electrically converts incident light from the image pickup optical system, in a range where a condition that a Modulation Transfer Function (MTF) of the image pickup optical system when the correction lens is positioned at the determined reference position is equal to or larger than a threshold is satisfied.

According to another aspect of the present invention, there is provided a method for controlling a shake correction apparatus having an image pickup optical system that includes a correction lens capable of moving in a direction orthogonal to an optical axis, the method comprising: a detection step of detecting shake applied to the shake correction apparatus; a determination step of determining a reference position of the correction lens; and a driving step of driving the correction lens with the reference position serving as a center position, so as to correct the shake detected in the detection step; wherein in the determination step, the reference position is determined such that the correction lens corrects shift from the optical axis of the center of an image pickup element that photo electrically converts incident light from the image pickup optical system, in a range where a condition that a Modulation Transfer Function (MTF) of the image pickup optical system when the correction lens is positioned at the determined reference position is equal to or larger than a threshold is satisfied.

With the above configuration, according to the present invention, it is possible to suppress a reduction in optical performance when correcting optical axis shift.

Further features of the present invention will become apparent from the following description of exemplary embodiments with reference to the attached drawings.

BRIEF DESCRIPTION OF THE DRAWINGS

FIG. 4 is a flowchart that shows a flow of processing to determine a reference position for the control center position.

DESCRIPTION OF THE EMBODIMENTS

Embodiments of the present invention will now be described with reference to attached drawings. It should be noted that the technical scope of the present invention is defined by claims, and is not limited by each embodiment described below. In addition, not all combinations of the features described in the embodiments are necessarily required for realizing the present invention.

[First Embodiment]

Figure 1:
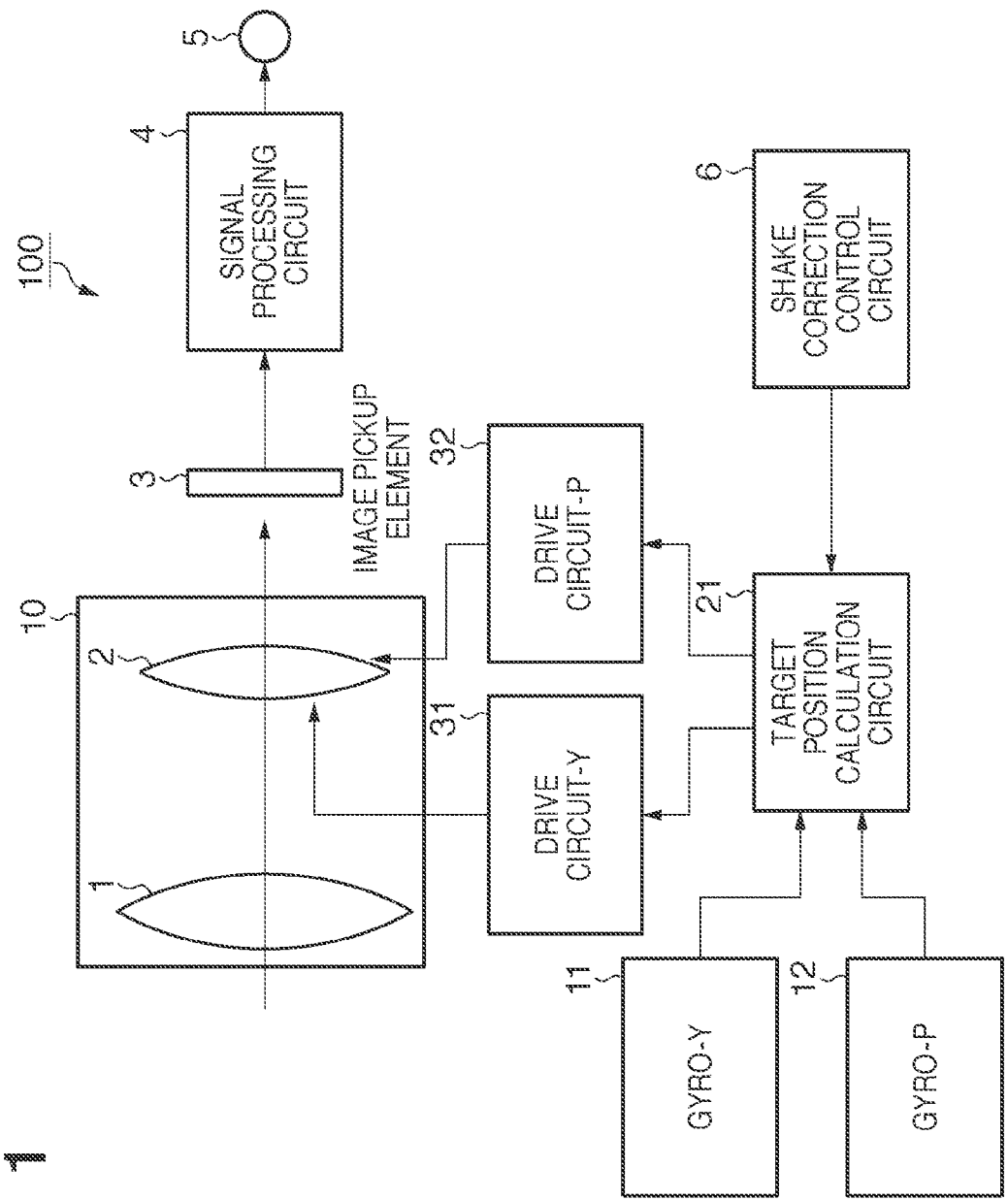
FIG. 1 is a block diagram that shows the configuration of an image pickup apparatus 100 provided with a shake correction apparatus according to the present invention.

FIG. 1 is a block diagram that shows the configuration of an image pickup apparatus 100 provided with a shake correction apparatus according to the present invention. In FIG. 1, an image pickup optical system 10 includes an image pickup lens 1, and a correction lens 2 for correcting shake applied to the image pickup apparatus 100. The correction lens 2 is capable of moving in a direction orthogonal to the optical axis of the image pickup optical system 10. An image pickup element 3 performs photoelectric conversion of incident light from the image pickup optical system 10. A signal processing circuit 4 processes an electrical signal obtained by the photoelectric conversion in the image pickup element 3, thus converting the electrical signal to a standard video signal or the like, for example. An output terminal 5 outputs the standard video signal obtained from the signal processing circuit 4. By the above configuration, the image pickup apparatus 100 outputs a captured image as a standard video signal.

A gyro-Y 11 and a gyro-P 12 are angular velocity sensors that detect angular velocity in the yaw direction and the pitch direction respectively, with respect to shake applied to the image pickup apparatus 100. In the present embodiment, the gyro-Y 11 and the gyro-P 12 are disposed so as to detect the angular velocity of a shake rotation component in rotation axes orthogonal to each other in a flat plane orthogonal to the optical axis of the image pickup optical system 10.

A target position calculation circuit 21 calculates a target position of the correction lens 2, based on the angular velocity detected by the gyro-Y 11 and the gyro-P 12 and shift (optical axis shift) of the center of the image pickup element 3 from the optical axis of the image pickup optical system 10 (described in detail below with reference to FIG. 2). A drive circuit-Y 31 and a drive circuit-P 32 drive the correction lens 2 so as to move to the target position calculated by the target position calculation circuit 21.

A shake correction control circuit 6 controls the target position calculation circuit 21 according to instruction by a user concerning whether or not to execute shake correction (described in detail below with reference to FIG. 2). The user can instruct whether or not to execute shake correction via a switch or a menu screen (not shown).

The image pickup apparatus 100 is provided with a computer, and the computer executing a program can realize the functions of the respective blocks above.

Figure 2:
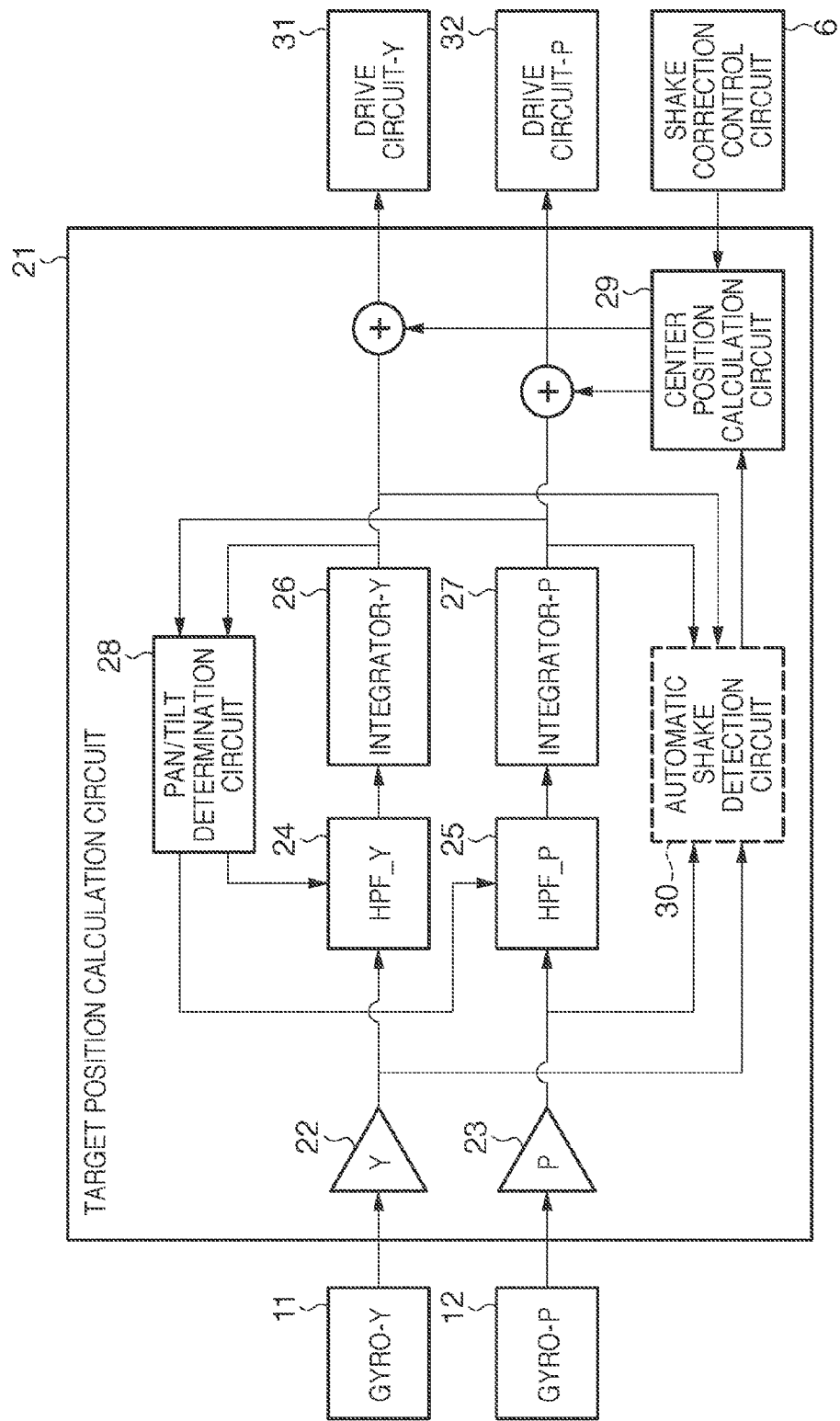
FIG. 2 is a block diagram that shows a detailed configuration of a target position calculation circuit.

Next is a detailed description of processing to calculate a target position by the target position calculation circuit 21, with reference to FIG. 2. An amplifier-Y 22 and an amplifier-P 23 respectively amplify the angular velocity signals detected by the gyro-Y 11 and the gyro-P 12. High-pass filters HPF_Y 24 and HPF_P 25 are high-pass filters that have variable frequency characteristics, and block a low frequency component included in the angular velocity signals that have been amplified by the amplifier-Y 22 and the amplifier-P 23, and output the remaining component. An integrator-Y 26 and an integrator-P 27 respectively obtain an angular displacement amount by integrating the angular velocity signals that have been output from the HPF_Y 24 and the HPF_P 25. The angular displacement amount is a correction amount for correcting shake of the image pickup apparatus 100, and corresponds to the target position of the correction lens 2.

A pan/tilt determination circuit 28 determines panning and tilting based on the angular displacement amount that has been output from the integrator-Y 26 and the integrator-P 27. Also, the pan/tilt determination circuit 28 performs panning control and tilting control by changing the frequency characteristics of the HPF_Y 24 and the HPF_P 25 according to the determination of panning and tilting.

A center position calculation circuit 29 calculates a control center position of the correction lens 2 based on information from the shake correction control circuit 6 indicating whether or not to execute shake correction. The control center position is the position where the correction lens 2 is fixed as the center position in the drive range in correction lens control when the correction lens 2 is driven in a direction that eliminates shifting of the optical axis center and the shake correction amount is zero during executing shake correction. The result of calculation by the center position calculation circuit 29 is added to the angular displacement amount output from the integrator-Y 26 and the integrator-P 27, and drive signals that indicate a final target position are generated.

Note that although not shown, when shake correction is stopped by an instruction by the user to the shake correction control circuit 6, and the correction amount is zero, the result of calculation by the center position calculation circuit 29 is used unchanged as the drive signal (that is, the angular displacement amounts output from the integrator-Y 26 and the integrator-P 27 are not used).

The drive signals thus obtained are input to the drive circuit-Y 31 and the drive circuit-P 32. The drive circuit-Y 31 and the drive circuit-P 32 drive the correction lens 2 according to the drive signal, centering on the control center position. When shake correction is stopped by an instruction by the user to the shake correction control circuit 6, the correction amount becomes zero, and the correction lens 2 is driven to the control center position and fixed at that position.

The target position calculation circuit 21 may be further provided with an automatic shake detection circuit 30. In this case, the automatic shake detection circuit 30 determines whether or not shake is being applied to the image pickup apparatus 100 based on output from the amplifier-Y 22 and the amplifier-P 23, and also output from the integrator-Y 26 and the integrator-P 27. The automatic shake detection circuit 30 notifies the center position calculation circuit 29 of the result of the determination. The center position calculation circuit 29 calculates the control center position based on information from the shake correction control circuit 6 indicating whether or not to execute shake correction, and the result of determining whether shake is occurring from the automatic shake detection circuit 30 (described in detail below with reference to FIG. 4).

Figure 3:
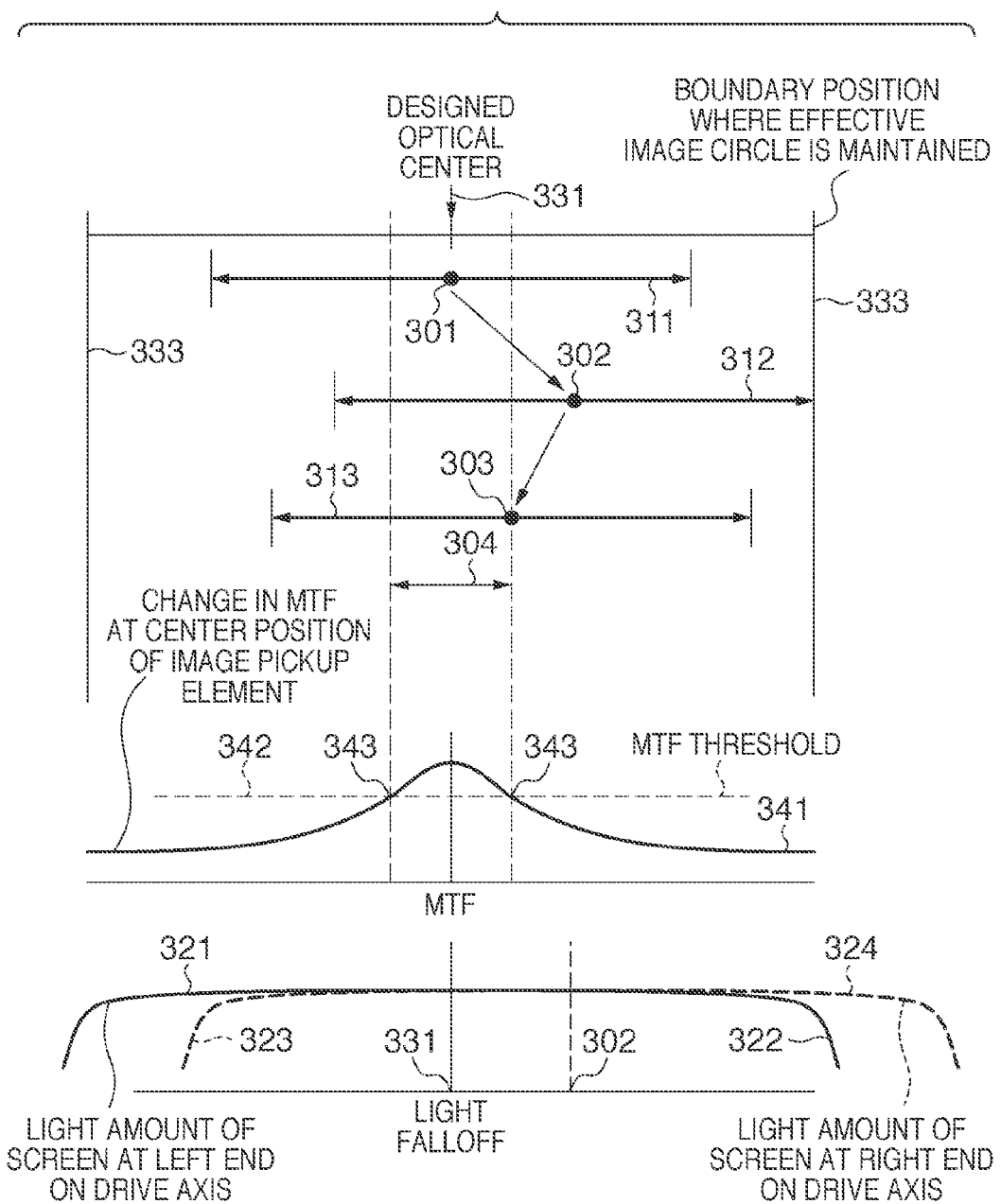
FIG. 3 shows the relationship between a control center position of a correction lens 2 and optical performance.

Next is a description of the relationship between the control center position of the correction lens 2 and optical performance (MTF), with reference to FIG. 3. Here, optical performance (MTF) is a property that indicates both contrast and resolution. The drive range of the correction lens 2 is in a plane orthogonal to the optical axis, but in order to simplify the description, the description is limited to only one axis in the plane of the drive range in FIG. 3. For the horizontal axis in FIG. 3, one axis in the drive plane that passes through the optical axis center of the image pickup optical system 10 is extracted, and this horizontal axis indicates a coordinate position of the center position of the correction lens 2. The middle of the horizontal axis is a designed optical center 331.

Referring to change in the Modulation Transfer Function (MTF) shown in the lower part of FIG. 3, an MTF 341 at the center position of the image pickup element decreases as the correction lens 2 is separated further from the designed optical center 331. When a threshold 342 indicates the threshold of optical performance compensation with respect to the MTF, the MTF is equal to or larger than the threshold if the correction lens 2 is positioned in a range 304 between optical performance (MTF) compensation points 343, but if the correction lens 2 is positioned outside of the range 304, MTF becomes less than the threshold, and image deterioration increases.

Solid vertical lines at the left and right ends of FIG. 3 indicate boundary positions 333 of the center position of the correction lens 2 where it is possible to keep an entire screen within an effective image circle. If the center position of the correction lens 2 is within the range of these boundary positions, it is possible for the entire screen to be contained within the optical image circle, but if these boundaries are exceeded, a range exceeding the effective image circle is captured in the image, and so mechanical vignetting or the like of the screen occurs.

When there is no optical axis shift (when the optical axis center matches the designed optical center), the control center position of the correction lens 2 is at a position 301, and the drive range is a range 311.

Changes in light falloff are shown in the lowest part of FIG. 3. If there is no optical axis shift, the screen light amount at the left end of the drive axis of the correction lens 2 is indicated by a solid line 321, and the screen light amount at the right end of the drive axis of the correction lens 2 is indicated by a solid line 322. As indicated by the solid lines 321 and 322, light falloff occurs with left-right symmetry centered on the designed optical center 331. However, when there is optical axis shift, the screen light amount at the left end of the drive axis of the correction lens 2 is indicated by a dotted line 323, and the screen light amount at the right end of the drive axis of the correction lens 2 is indicated by a dotted line 324. Here, as indicated by the dotted lines 323 and 324, light falloff occurs centered on a position shifted from the designed optical center 331. Accordingly, when the correction lens 2 is driven in accordance with the designed optical center 331 as indicated by the range 311, the manner of light falloff differs between the right end and the left end of the drive range, and so a peripheral light amount is unbalanced. Consequently, in order to correct the optical axis shift, it is necessary to correct the control center position and the drive range of the correction lens 2 (necessary to shift the position according to the optical axis shift).

When correcting optical axis shift according to the dotted lines 323 and 324, the control center position of the correction lens 2 is at a position 302, and the drive range is a range 312. Thus, it is possible to obtain balance in the drive range for the change in light falloff indicated by the dotted lines 323 and 324.

However, the position 302 is outside of the range 304, and so MTF is less than the threshold value. When shake correction is executed and the correction lens 2 is driven within the range 312, even if MTF decreases, visible image deterioration is difficult to identify in view of dynamic resolution. However, when the image pickup apparatus 100 is stationary and so the correction lens 2 is stationary at the position 302, image deterioration due to an MTF decrease is apparent.

Consequently, when shake correction has not been executed, the control center position of the correction lens 2 is determined with priority given to optical performance. Specifically, a position 303, which is the boundary of the range where the condition that the optical performance (MTF) is equal to or larger than the threshold is satisfied, is set as the control center position of the correction lens 2. Thus, a reduction in optical properties when correcting optical axis shift is suppressed, and so a deterioration in image quality is suppressed. Also, even when shake correction has been executed, the position 303 may be determined as the control center position of the correction lens 2 so that optical performance (MTF) is equal to or larger than the threshold. In this case, the drive range of the correction lens 2 is a range 313.

Next is a description of processing to determine a reference position for the control center position, with reference to FIG. 4. Here, 'reference position' means a final target position for the control center position. Ordinarily, the control center position is the same as the reference position, but when the control center position changes suddenly, image quality may sometimes decrease. Consequently, the center position calculation circuit 29 first determines the reference position, and afterward moves the control center position in steps to the reference position. Accordingly, when the reference position has changed (that is, when the center position calculation circuit 29 has determined a new reference position), the center position calculation circuit 29 moves the control center position in steps from the original reference position to the new reference position. However, when decreased image quality due to sudden movement of the correction lens 2 is allowed, the center position calculation circuit 29 may move the control center position immediately to the reference position.

The processing in this flowchart is repeatedly executed at a predetermined period (for example, a period of generation of a vertical sync signal). Also, prior to the processing in this flowchart, the center position calculation circuit 29 determines a 'provisional reference position'. This 'provisional reference position' is the control center position of the correction lens 2 when correcting optical axis shift without consideration of an MTF decrease, and corresponds to position 302 in the example in FIG. 3.

In step S401, the center position calculation circuit 29 determines whether or not the MTF of the provisional reference position is equal to or larger than the threshold (that is, whether or not the provisional reference position is within the range 304). When the result of this determination is 'Yes', the processing routine proceeds to step S402, and when the result of this determination is 'No', the processing routine proceeds to step S403.

In step S402, the center position calculation circuit 29 determines the provisional reference position to be the reference position, and moves the control center position in steps to the reference position.

In step S403, the center position calculation circuit 29 determines whether or not execution of shake correction has been instructed according to input from the shake correction control circuit 6. When the result of this determination is 'Yes', the processing routine proceeds to step S404, and when the result of this determination is 'No', the processing routine proceeds to step S406. Note that the processing in step S404 is optional, and the processing routine may proceed to step S405 when the result of the determination in step S403 is 'Yes'.

In step S404, the center position calculation circuit 29, based on input from the automatic shake detection circuit 30, determines whether or not shake is occurring in the image pickup apparatus 100. That is, the center position calculation circuit 29 determines whether or not shake applied to the image pickup apparatus 100 has been detected by the gyro-Y 11 or the gyro-P 12. When the result of this determination is 'Yes', the processing routine proceeds to step S405, and when the result of this determination is 'No', the processing routine proceeds to step S406. When the result of this determination is 'No', for example when a photographer has fixed the image pickup apparatus 100 to an item such as a tripod, shake is not applied to the image pickup apparatus 100, or if shake is applied, the amount of that shake is so small that shake correction is not required.

In step S405, the center position calculation circuit 29 determines the provisional reference position (in the example in FIG. 3, position 302) to be the reference position, and moves the control center position in steps to the reference position. On the other hand, in step S406, the center position calculation circuit 29 determines the position of the MTF threshold (in the example in FIG. 3, position 303) to be the reference position, and moves the control center position in steps to the reference position. Thus, when shake correction has been stopped (No in step S403), or when a shake operation is executed but shake is not detected (No in step S404), the position of the correction lens 2 is moved to the MTF threshold position and stopped even if the MTF at the control center position of the correction lens 2 is less than the threshold.

With the processing in step S405, correction of optical axis shift and elimination of an unbalanced peripheral light amount are given priority over optical performance. Specifically, when shake correction is executed ('Yes' in step S403), worsened image quality due to a reduction in optical performance is not fully recognized by the user, so in the example in FIG. 3, the control center position remains at position 302, and does not move to position 303. However, when execution of shake correction has been instructed, but the image pickup apparatus 100 is not shaking and so shake correction is not actually executed ('No' in step S404), by moving from step S404 to step S406, a reduction in optical performance is suppressed.

In the above processing flow, the reason that the control center position is moved in steps to the reference position is to prevent a situation in which, due to abruptly moving the center position, the shake detection position also abruptly changes, resulting in a picture for which the image pickup apparatus moved separately from the detected shake. Accordingly, the correction method used in a case where the control center position is gradually changed can be any method as long as the movement of the correction lens 2 is at a level that cannot be visually recognized along with this correction operation. For example, for the vertical sync signal, a change amount of no more than one pixel per period is set.

As described above, according to the present embodiment, the center position calculation circuit 29 determines the reference position for the control center position of the correction lens 2 so as to correct optical axis shift, in a range where the condition that the optical property (MTF) is equal to or larger than the threshold is satisfied. Thus, a reduction in optical performance when correcting optical axis shift is suppressed.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-167274, filed on Jul. 15, 2009, which is hereby incorporated by reference herein in its entirety.

What is claimed is:

1. A shake correction apparatus having an image pickup optical system that includes a correction lens capable of moving in a direction orthogonal to an optical axis, the shake correction apparatus comprising:
   a detection unit that detects shake applied to the shake correction apparatus;
   a determination unit that determines a reference position of the correction lens; and
   a drive unit that drives the correction lens with the reference position serving as a center position, so as to correct the shake detected by the detection unit;
   wherein the determination unit determines the reference position such that the correction lens corrects shift from the optical axis of the center of an image pickup element that photo electrically converts incident light from the image pickup optical system, in a range where a condition that a Modulation Transfer Function (MTF) of the image pickup optical system when the correction lens is positioned at the determined reference position is equal to or larger than a threshold is satisfied.

2. The shake correction apparatus according to claim 1, further comprising a control unit that controls the drive unit so as to stop correction of shake detected by the detection unit;
   wherein when the shake correction is stopped, the drive unit fixes the correction lens at the center position, and when the shake correction is not stopped, the determination unit determines the reference position without consideration of said condition.

3. The shake correction apparatus according to claim 2, wherein even when the shake correction is not stopped, when shake is not detected by the detection unit or when the shake detected by the detection unit is slight, the determination unit determines the reference position in consideration of said condition, and the drive unit fixes the correction lens at the center position.

4. The shake correction apparatus according to claim 2, wherein when the determination unit has determined a new reference position, the drive unit changes the center position in steps from the original reference position to the new reference position.

5. An image pickup apparatus comprising the shake correction apparatus according to claim 1.

6. A method for controlling a shake correction apparatus having an image pickup optical system that includes a correction lens capable of moving in a direction orthogonal to an optical axis, the method comprising:
   a detection step of detecting shake applied to the shake correction apparatus;
   a determination step of determining a reference position of the correction lens; and
   a driving step of driving the correction lens with the reference position serving as a center position, so as to correct the shake detected in the detection step;
   wherein in the determination step, the reference position is determined such that the correction lens corrects shift from the optical axis of the center of an image pickup element that photo electrically converts incident light from the image pickup optical system, in a range where a condition that a Modulation Transfer Function (MTF) of the image pickup optical system when the correction lens is positioned at the determined reference position is equal to or larger than a threshold is satisfied.

7. A non-transitory computer-readable storage medium storing therein a program for causing a computer to execute each step of the control method according to claim 6.

* * * * *